United States Patent Office 3,419,614
Patented Dec. 31, 1968

3,419,614
PREPARATION OF THIOLS AND THIOETHER COMPOUNDS
Richard C. Doss, Bartlesville, Okla., assignor to Phillips Petroleum Company, a corporation of Delaware
No Drawing. Filed Sept. 30, 1965, Ser. No. 491,876
6 Claims. (Cl. 260—583)

ABSTRACT OF THE DISCLOSURE

A process for increasing the yield of thiol compounds which comprises reacting ethylenically unsaturated compounds with hydrogen sulfide in the presence of sulfur and a basic material at a temperature of from 230–400° C.

---

This invention relates to the addition of sulfur to unsaturated compounds. In one aspect this invention relates to controlling the addition of sulfur to the unsaturated compounds so that an increase in the yield of thiols is achieved. Another aspect of the invention relates to the addition of sulfur to compounds having unsaturated linkages between carbon atoms in the presence of catalysts.

It is known to produce thiol and thioether compounds by reacting sulfur or hydrogen sulfide with ethylenically unsaturated compounds. It is also known that if ammonia or a basic material is added to the reaction mixture as a catalyst that the yield of thiol and thioether compounds will be appreciably increased.

I have now discovered that if the reaction is conducted within a temperature range from 230–400° C. the yield of thiols is increased and the yield of thioethers and polythioethers is decreased. Therefore, it is an object of this invention to teach a method for increasing the yield of thiols in a reaction in which hydrogen sulfide is reacted with an ethylenically unsaturated compound in the presence of free sulfur and a base.

Other objects and many of the attendant advantages of this invention will be readily appreciated as the same become better understood by reference to the following detailed description.

The ethylenically unsaturated compounds used in this invention to react with the hydrogen sulfide and the elemental sulfur can be those represented by the following general formula:

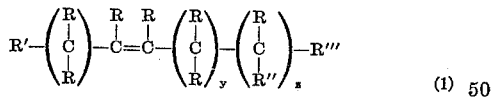

(1)

where $x$ is an integer from 0 to 5; $y$ is an integer from 0 to 5; $z$ is an integer of 0 or 1; R is selected from the group consisting of hydrogen and alkyl, cycloalkyl, and aryl radicals, and combinations thereof such as alkaryl, aralkyl, and the like, said radicals preferably having 1 to 8 carbon atoms; R' and R'' are selected from the group consisting of hydrogen and alkyl radicals preferably having 1 to 5 carbon atoms, and together can form a covalent bond with the proviso that when they form said covalent bond that the sum of $x$ and $y$ is at least 2; and R''' is selected from the group consisting of hydrogen, alkyl radicals preferably having 1 to 5 carbon atoms, —NR''''$_2$ and —OR'''' where R'''' is selected from the group consisting of hydrogen and alkyl radicals preferably having 1 to 5 carbon atoms.

Representative ethylenically unsaturated compounds coming within the scope of Formula 1 and useful in the practice of this invention include:

ethylene
propylene
1-butene
2-butene
2-pentene
2-hexene
1-octene
1-decene
4-hendecene
3-tetradecene
9-eicosene
3-methyl-2-hexene
3,5,7-trimethyl-4-decene
6-n-butyl-4-hexadecene
cyclopentene
cyclohexene
cyclooctene
cyclodecene
cyclohendecene
4-n-butylcyclohexene
allylamine
N-methylallylamine
N,N-dimethylallylamine
N,N-di-n-pentylallylamine
4-methyl-4-pentenylamine
N-ethyl-(1-ethylallyl)amine
N,N-di-n-propylallylamine
N-isopropyl-(2-isopropyl-3-butenyl)amine
1,1,2,2-tetraethyl-3-butenylamine
N-n-pentyl-N-n-butyl-4-hendecenylamine
3-cyclohexenylamine
3,6-dimethyl-5-aminocyclooctene
N,N-di-n-butyl-4-n-pentyl-3-aminocyclohexane
allyl alcohol
methallyl alcohol
2-methyl-3-hexenyl alcohol
2-decenyl alcohol
4-hendecenyl alcohol
3-hydroxycyclohexene
5-hydroxycyclooctene
3-methoxypropene
4-n-pentoxy-1-butene
1-ethoxy-2-butene
11-isopropoxy-4-hendecene
3-methoxycyclopentene
3-n-butyl-9-n-pentoxycyclohendecene
4-n-butoxycyclohexene
cyclohexylethylene
3-methylcyclopentylethylene
allylcyclopentane
styrene
p-tolylethylene
allylbenzene
propenylbenzene
3-butenylbenzene
stilbene
1,2-dicyclohexylethylene and the like, including mixtures of such compounds. The total number of carbon atoms in these ethylenically unsaturated compounds can vary, but generally will not exceed 20.

Generally, for most preparations of the thiol compounds the amount of sulfur will be within the range of about 0.2–5 gram atoms of sulfur pel mol of olefin, usually being within the range of about 0.4–3 gram atoms of sulfur per mol of olefin.

The ratio of hydrogen sulfide to olefin will generally be within the range of about 0.2–5 mols of hydrogen sulfide per mol of olefin, usually being within the range of about 0.5–3 mols of hydrogen sulfide per mol of olefin.

It is also necessary in this invention to carry out the reaction in the presence of a basic compound which has a catalytic effect. These basic compounds representatively include ammonia, primary, secondary, and tertiary amines. Such basic compounds can be represented by the general formula $N(R''''')_3$ where $R'''''$ is hydrogen or an alkyl radical preferably having 1–8 carbon atoms.

Representative amines useful as basic catalysts in this invention include methylamine, dimethylamine, trimethylamine, ethylamine, diethylamine, triethylamine, di-n-butylamine, tri-n-butylamine, tri-sec-hexylamine, tri-n-octylamine, and the like, including mixtures of such amines. In addition, alkali metal hydroxides can be used as such basic compounds, including the hydroxides of sodium, potassium, lithium, rubidium, and cesium. Where such basic catalyst is employed, the amount thereof, stated functionally, to be used in this invention is a catalytic amount; generally the amount of basic compound will be in the range from 0.25 to 40 grams per mol, preferably 1 to 20 grams per mol, of the ethylenically unsaturated compound.

The reaction can be carried out between a temperature of 230° C. up to 400° C. and preferably within the range of about 230–350° C. The reaction time varies over a wide range, depending in part on the particular reaction temperature and the nature of the reactant; however, it will generally be within the range of about 10 minutes to about 10 hours, usually being within the range of about 30 minutes to about 6 hours.

If desired, a solvent can be used or the olefin itself can serve as a solvent. Examples of some suitable solvents include aromatic hydrocarbons such as benzene, toluene, and xylene; aliphatic hydrocarbons such as pentane, hexane, and octane; cycloaliphatic hydrocarbons such as cyclopentane and cyclohexane; and polar solvents such as sulfolane. The reaction is conveniently carried out in a closed vessel under autogenous pressure; however, lower or higher pressures, e.g., atmospheric pressure to a pressure of 3000 p.s.i.g. or more, can be employed if desired.

The improved reaction of this invention can be carried out in a manipulative manner like that of the prior art, and can be effected in a batch, intermittent, or continuous manner.

After reaction is completed to the desired degree, the products of reaction can be recovered by well known procedures. For example, gases can be vented, recovered and recycled, if desired, and the product fractionated, crystallized or subjected to various other separation and recovery procedures to obtain the desired sulfur compounds. By operating at the particular temperature range designated in the specification hereinabove, the percentage of thiol compound is substantially increased.

The thiol compounds such as those prepared according to this invention have well known utilities, and their uses representatively include pesticides, dyestuff intermediates, pharmaceuticals (such as anti-radiation drugs), inhibitors for enzymatic deterioration of plants, and rubber polymerization chemicals, such as polymerization modifiers. The following examples are presented to demonstrate the advantage of conducting this reaction of elemental sulfur, hydrogen sulfide, and basic constituent with olefin at a temperature range from 230–240° C. to increase the yield of thio compounds.

Example I

A mixture of 30 g. (0.94 g.-atom) of elemental sulfur, 90 g. (1.6 mols) of 1-butane, 55 g. (1.62 mols) of hydrogen sulfide, and 30 g. (1.75 mols) of anhydrous ammonia was stirred and heated at 250° C. for 1.5 hours at an initial pressure of 1700 p.s.i.g. The reaction mixture was cooled, and the reactor was vented, whereupon there was obtained in a cold trap 7.0 g. of 1-butene. The residual reaction mixture, which weighed 126.8 g. was analyzed by gas chromatography. The mixture was then distilled until the distillation pot temperature reached 165° C./0.1 mm., giving a residue weighing 2.6 g. The yield of products was calculated on the basis of the above gas chromatographic analysis by first subtracting the weight of the distillation residue from the weight of the reaction mixture. The identity of the various components was determined, where practical, by injection of a known sample simultaneously with a portion of the reaction mixture and comparing the elution temperatures and peak heights. The results of this analysis are summarized in Table I.

TABLE I

| Product | Weight, g. | Yield [1], mol Percent |
|---|---|---|
| 1-butene [2] | 6.5 | |
| 2-butanethiol [2] | 54 | 42.7 |
| 1-butanethiol [2] | 3.7 | 2.9 |
| Di-sec-butyl sulfide [2] | 14.1 | 13.8 |
| n-Butyl sec-butyl sulfide | 10.7 | 10.4 |
| Di-n-butyl sulfide [2] | 10.0 | 9.8 |
| Dibutyl disulfides | 25.0 | 20.0 |

[1] Based on 1-butene converted to non-polymeric material.
[2] Identified gas chromatographically.

Example II

Another experiment was carried out similarly except that no ammonia was employed. A mixture of 30 g. (0.94 g.-atom) of sulfur, 120 g. (2.1 mols) of 1-butene, and 54 g. (1.59 mols) of hydrogen sulfide was heated at 250° C. for 1.5 hours at an initial pressure of 1150 p.s.i.g. The reaction mixture was cooled, and the reactor was vented, whereupon there was obtained in a cold trap 10.0 g. of 1-butene. The residual mixture, which weighed 160 g., was analyzed gas chromatographically as in Example I, for the 5.0 g. of residue which remained undistilled in a subsequent distillation in which the distillation pot was heated to 165° C./01. mm. The results of this analysis are summarized in Table II.

TABLE II

| Product | Weight, g. | Yield [1], mol Percent |
|---|---|---|
| 1-butene [2] | 6.3 | |
| 2-butanethiol [2] | 44.0 | 26.4 |
| 1-butanethiol [2] | 5.9 | 3.7 |
| Di-sec-butyl sulfide [2] | 29.0 | 21.5 |
| n-Butyl sec-butyl sulfide | 23.2 | 13.5 |
| Di-n-butyl sulfide [2] | 5.8 | 3.2 |
| Dibutyl disulfides | 44.3 | 26.8 |

[1] Based on 1-butene converted to non-polymeric material.
[2] Identified gas chromatographically.

Thus, it can be seen that the mole ratio of thiols to thioethers was 1:2 in this example whereas in Example I, it was approximately 1:1, in which ammonia was present during the reaction.

Example III

A mixture of 30 g. (0.94 g.-atom) of elemental sulfur, 90 g. (1.6 mols) of 1-butene, 75 g. (2.2 mols) of hydrogen sulfide, and 35 g. (2.1 mols) of anhydrous ammonia was stirred and heated at 150° C. for 1.5 hours at an initial pressure of 1300 p.s.i.g. The reaction mixture was cooled, and the reactor was vented, whereupon there was obtained in a cold trap 10.0 g. of 1-butene. The residual reaction mixture consisted of 62.0 g. of a clear yellow liquid and 122 g. of solids containing some adhering liquid. Additionally, some 1-butene was lost by evaporation when the reactor was opened. The solids consisted of a considerable amount of white solids, presumably ammonium sulfide or ammonium polysulfide, adhering to the top of the reactor and cooling coils, and a large amount of unreacted sulfur in the bottom of the reactor. The clear yellow liquid was analyzed by gas chromatography. The results of this analysis are summarized in the table below.

TABLE III

| Product: | Weight, g. |
|---|---|
| 1-butene [1] | 11.7 |
| 2-butanethiol [1] | 6.3 |
| 1-butanethiol | 0 |
| Di-sec-butyl sulfide [1] | 28.5 |
| n-Butyl sec-butyl sulfide | 8.3 |
| Di-n-butyl sulfide [1] | Trace |
| Dibutyl disulfides | 7.0 |

[1] Identified gas chromatographically.

Thus the weight ratio of thiols to sulfides is reduced to 1:7 when the reaction is carried out at 150° C. even in the presence of ammonia. These examples demonstrate the criticality of the temperature in the reaction described hereinabove in order to increase the ratio of thiols to thioethers produced.

Various modifications and alterations of this invention will become apparent to those skilled in the art from the foregoing description without departing from the scope and spirit of this invention, and it should be understood that this invention is not to be limited unduly to that set forth herein for illustrative purposes.

I claim:

1. In a process for preparing organic thiol compounds which comprises reacting organic compounds having the formula

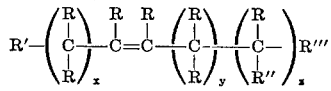

where $x$ is an integer from 0 to 5, $y$ is an integer from 0 to 5, $z$ is an integer of 0 or 1, R is selected from the group consisting of hydrogen, alkyl, cycloalkyl, and aryl radicals, and combinations thereof, said radicals having 1 to 8 carbon atoms, R' and R" are selected from the group consisting of hydrogen and alkyl radicals having 1 to 5 carbon atoms and together can form a covalent bond with the proviso that when they form said covalent bond that the sum of $x$ and $y$ is at least 2, and R''' is selected from the group consisting of hydrogen, alkyl radicals having 1 to 5 carbon atoms, —NR''''$_2$, or OR'''' where R'''' is selected from the group consisting of hydrogen and alkyl radicals having 1 to 5 carbon atoms with hydrogen sulfide in the presence of sulfur and a basic material; the improvement comprising the step of maintaining the temperature at a range from 230–400° C. during the reaction and recovering said organic thiol compounds from the resulting reaction mixture.

2. A process for preparing organic thiol compounds wherein said process comprises the step of reacting monoolefinic compounds with hydrogen sulfide in the reaction zone in the presence of a basic material present in the amount of 0.25–40 grams per mol of said monoolefinic compound and an amount of sulfur in the range of 0.2–5 gram atoms per mol of said monoolefinic compound charged to said reaction zone, said monoolefinic compound having the formula:

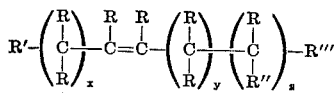

where $x$ is an integer from 0 to 5, $y$ is an integer from 0 to 5, $z$ is an integer of 0 or 1, R is selected from the group consisting of hydrogen and alkyl, cycloalkyl, and aryl radicals, and combinations thereof, said radicals having 1 to 8 carbon atoms, R' and R" are selected from the group consisting of hydrogen and alkyl radicals having 1 to 5 carbon atoms, and together can form a covalent bond with the proviso that when they form said covalent bond that the sum of $x$ and $y$ is at least 2, and R''' is selected from the group consisting of hydrogen, alkyl radicals having 1 to 5 carbon atoms, —NR''''$_2$, and —OR'''' where R'''' is selected from the group consisting of hydrogen and alkyl radicals having 1 to 5 carbon atoms, wherein said basic material is selected from the group consisting of alkali metal hydroxides and compounds having the general formula: N(R''''')$_3$ where R''''' is selected from the group consisting of hydrogen and alkyl radicals having 1–8 carbon atoms; maintaining the temperature in a range from 230–400° C. during the reaction and recovering said organic thiol compounds from the resulting reaction mixture.

3. The process according to claim 2 wherein said monoolefinic compound is allylamine.

4. The process according to claim 2 wherein said monoolefinic compound is 1-butene.

5. The process according to claim 4 wherein said basic material is an alkali metal hydroxide.

6. The process according to claim 4 wherein said basic material is a compound having the general formula N(R''''')$_3$.

References Cited

UNITED STATES PATENTS 3,221,056  11/1965  Louthan _____ 260—583

CHARLES B. PARKER, *Primary Examiner.*

R. L. RAYMOND, *Assistant Examiner.*

U.S. Cl. X.R.

260—584, 609, 563, 570.5